(12) United States Patent
Hambleton et al.

(10) Patent No.: US 11,846,570 B2
(45) Date of Patent: Dec. 19, 2023

(54) FLOW DIVERTING WIND TUNNEL

(71) Applicant: WINFIELD SOLUTIONS, LLC, Arden Hills, MN (US)

(72) Inventors: William Hambleton, Hudson, WI (US); Daniel C. Bissell, Eagan, MN (US)

(73) Assignee: WinField Solutions, LLC, Arden Hills, MN (US)

( * ) Notice: Subject to any disclaimer, the term of this patent is extended or adjusted under 35 U.S.C. 154(b) by 68 days.

(21) Appl. No.: 17/322,334

(22) Filed: May 17, 2021

(65) Prior Publication Data

US 2021/0270692 A1 Sep. 2, 2021

Related U.S. Application Data (63) Continuation of application No. 16/897,908, filed on Jun. 10, 2020, now Pat. No. 11,047,764, which is a continuation of application No. 15/701,143, filed on Sep. 11, 2017, now Pat. No. 10,712,232.

(51) Int. Cl.
*G01M 9/04* (2006.01)
(52) U.S. Cl.
CPC ..................... *G01M 9/04* (2013.01)
(58) Field of Classification Search
CPC ........................................................ G01M 9/04
USPC ............................................................ 73/147
See application file for complete search history.

(56) References Cited

U.S. PATENT DOCUMENTS

| | | | |
|---|---|---|---|
| 2,592,322 A | 4/1952 | Nerad | |
| 3,111,842 A | 11/1963 | Fredette et al. | |
| 3,456,503 A | 7/1969 | Wise | |
| 3,552,202 A | 1/1971 | Kroeger et al. | |
| 3,739,634 A | 6/1973 | Johnson et al. | |
| 3,994,438 A | 11/1976 | Farmery | |
| 4,033,185 A | 7/1977 | Mcnally et al. | |
| 4,193,356 A | 3/1980 | Vehe et al. | |
| 4,648,267 A | 3/1987 | Seegmiller | |
| 4,751,844 A | 6/1988 | Matsushita | |
| 4,844,346 A | 7/1989 | Coffey | |

(Continued)

FOREIGN PATENT DOCUMENTS

| | | |
|---|---|---|
| AU | 2013206347 A1 | 1/2014 |
| CN | 102958359 A | 3/2013 |

(Continued)

OTHER PUBLICATIONS

Tomioka et al. Machine translation of JPH08122202A. Published May 1996. Accessed Dec. 2022. (Year: 1996).*

(Continued)

*Primary Examiner* — Walter L Lindsay, Jr.
*Assistant Examiner* — Philip T Fadul
(74) *Attorney, Agent, or Firm* — Dorsey & Whitney LLP (57) ABSTRACT

A wind tunnel device is provided herein that enables the wind tunnel to transform between two modes of operation and/or to refresh/recondition air within the tunnel. The wind tunnel device may provide selective diversion of airflow within the wind tunnel. The diversion of airflow may enable the wind tunnel device to include a multi-configurable wind tunnel that can be operated as either an open-return wind tunnel or a closed-return wind tunnel. Additionally, or alternatively, the diversion of airflow may enable the wind tunnel device to recondition air within a closed-return wind tunnel.

18 Claims, 9 Drawing Sheets

(56) References Cited

U.S. PATENT DOCUMENTS

| | | | |
|---|---|---|---|
| 5,186,046 A | 2/1993 | Gouterman et al. | |
| 5,922,649 A | 7/1999 | Pehu et al. | |
| 5,942,682 A | 8/1999 | Ghetzler et al. | |
| 6,155,111 A | 12/2000 | Wickern et al. | |
| 6,357,473 B1 | 3/2002 | Porter et al. | |
| 6,423,667 B1 | 7/2002 | Highsmith | |
| 6,607,146 B1 | 8/2003 | Alness et al. | |
| 6,797,673 B1 | 9/2004 | Worthley et al. | |
| 6,890,889 B1 | 5/2005 | Wichert et al. | |
| 6,997,049 B2 | 2/2006 | Lacey, Jr. | |
| 7,028,542 B2 | 4/2006 | Metni | |
| 7,666,242 B2 | 2/2010 | Gednalske et al. | |
| 7,997,130 B1 | 8/2011 | Stonner et al. | |
| 8,650,944 B2 | 2/2014 | Meis et al. | |
| 8,656,769 B2 | 2/2014 | Moliere | |
| 8,689,619 B2 | 4/2014 | Spandl et al. | |
| 8,809,234 B1 | 8/2014 | Parrish | |
| 9,116,068 B2 | 8/2015 | Spandl et al. | |
| 9,599,550 B2 | 3/2017 | Van Der Mark et al. | |
| 9,816,895 B2 | 11/2017 | Sterling | |
| 9,938,201 B1 | 4/2018 | Scott et al. | |
| 10,107,713 B2 | 10/2018 | Spandl et al. | |
| 10,359,337 B1 | 7/2019 | Bissel et al. | |
| 10,464,080 B1 | 11/2019 | Hagberg | |
| 10,775,264 B1 | 9/2020 | Bissell et al. | |
| 2002/0148507 A1 | 10/2002 | Porter et al. | |
| 2004/0069875 A1 | 4/2004 | Bui | |
| 2005/0173561 A1 | 8/2005 | Cotter et al. | |
| 2006/0011741 A1 | 1/2006 | Hahn et al. | |
| 2006/0231000 A1 | 10/2006 | Eastin et al. | |
| 2006/0264328 A1 | 11/2006 | Modaressi et al. | |
| 2009/0241817 A1 | 10/2009 | Eastin et al. | |
| 2012/0060536 A1 | 3/2012 | Ahonen et al. | |
| 2013/0037625 A1 | 2/2013 | Arenson et al. | |
| 2013/0123104 A1 | 5/2013 | Mcknight et al. | |
| 2013/0180325 A1 | 7/2013 | Spandl et al. | |
| 2013/0324401 A1 | 12/2013 | Spesard et al. | |
| 2014/0018240 A1 | 1/2014 | Crosby et al. | |
| 2015/0038442 A1 | 2/2015 | Van Der Krieken et al. | |
| 2015/0045224 A1 | 2/2015 | Parrish | |
| 2015/0150249 A1 | 6/2015 | Nolte et al. | |
| 2015/0237851 A1 | 8/2015 | Drew | |
| 2015/0250165 A1 | 9/2015 | Balastre et al. | |
| 2015/0272106 A1 | 10/2015 | Schertz | |
| 2015/0346052 A1 | 12/2015 | Spandl et al. | |
| 2016/0116184 A1* | 4/2016 | Chappell | F24F 13/1406 454/335 |
| 2016/0165885 A1 | 6/2016 | Wikeley et al. | |
| 2016/0192642 A1 | 7/2016 | Lindner et al. | |
| 2016/0192649 A1 | 7/2016 | Lindner | |
| 2016/0227765 A1 | 8/2016 | Di Modugno et al. | |
| 2016/0245541 A1* | 8/2016 | Karamanos | G05B 19/042 |
| 2016/0360744 A1 | 12/2016 | Magidow et al. | |
| 2016/0374334 A1 | 12/2016 | Di Modugno et al. | |
| 2017/0006859 A1 | 1/2017 | Raman et al. | |
| 2017/0036228 A1 | 2/2017 | Thurow et al. | |
| 2017/0042142 A1 | 2/2017 | Baur et al. | |
| 2017/0086363 A1 | 3/2017 | Tribelhorn | |
| 2017/0127668 A1 | 5/2017 | Berg et al. | |
| 2017/0238536 A1 | 8/2017 | Goyal et al. | |
| 2017/0258078 A1 | 9/2017 | Costa et al. | |
| 2018/0052088 A1 | 2/2018 | Sarkar et al. | |
| 2018/0055045 A1 | 3/2018 | Baur et al. | |
| 2018/0077927 A1 | 3/2018 | Bonn | |
| 2018/0143100 A1 | 5/2018 | Lindner | |
| 2018/0171975 A1 | 6/2018 | Röhm | |
| 2018/0184647 A1 | 7/2018 | Bissell et al. | |
| 2019/0033165 A1 | 1/2019 | Spandl et al. | |
| 2019/0037836 A1 | 2/2019 | Bissell et al. | |
| 2019/0078970 A1 | 3/2019 | Hambleton et al. | |
| 2019/0078971 A1 | 3/2019 | Hambleton et al. | |
| 2019/0271628 A1 | 9/2019 | Littley et al. | |
| 2020/0116587 A1 | 4/2020 | Hambleton et al. | |
| 2021/0016309 A1 | 1/2021 | Bremer et al. | |
| 2021/0274702 A1 | 9/2021 | Bissell et al. | |
| 2021/0289693 A1 | 9/2021 | Harmon et al. | |

FOREIGN PATENT DOCUMENTS

| | | |
|---|---|---|
| CN | 110139560 A | 8/2019 |
| CN | 110333043 B | 3/2021 |
| EP | 3574756 A1 | 12/2019 |
| JP | H08122202 A | 5/1996 |
| JP | H10185756 A | 7/1998 |
| JP | 2005112792 A | 4/2005 |
| WO | 2006065815 A1 | 6/2006 |
| WO | 2006133788 A1 | 12/2006 |
| WO | 2011065831 A2 | 6/2011 |
| WO | 2011147766 A2 | 12/2011 |
| WO | 2015175719 A1 | 11/2015 |
| WO | 2016145000 A1 | 9/2016 |
| WO | 2018126017 A1 | 7/2018 |

OTHER PUBLICATIONS

"KIXOR Herbicide", Notice of Pesticide Registration, U.S. Environmental Protection Agency, Jan. 21, 2011, 22 pages, BASF Corporation.

AG Spray, Inc., "Safety Data Sheet—HALT "Drift Reduction Aid"", Apr. 28, 2016, 5 pages.

Agrisolutions, "Preference® Adjuvant Sell Sheet", Winfield Solutions, LLC, 2011, 2 pages.

Altieri, et al., "Mechanisms, Experiment, and theory of Liquid Sheet Breakup and Drop Size from Agricultural Nozzles", Atomization and Sprays, vol. 24, No. 8, pp. 695-721, 2014, Begell House, Inc.

ANSI/ASABE S592.1, "Best Management Practices for Boom Spraying", American Society of Agricultural and Biological Engineers, Aug. 2016, 14 pages.

Castro, et al., "Advances in Surfactants for Agrochemicals", Environ Chem Lett, vol. 12, pp. 85-95, 2014, Springer.

Clark, et al., "Aerodynamic Instability and Disintegration of Inviscid Liquid Sheets", Proceedings of the royal Society of London. Series A, Mathematical and Physical Sciences, vol. 329, No. 1579, pp. 467-478, Sep. 12, 1972, The Royal Society of Publishing, London England.

Davis, et al., "Mitigating Pesticide Spray Drift", Agriculture and Nature Resources; University of Arkansas, U.S. Department of Agriculture, and County Governments Cooperating, University of Arkansas, Agriculture and Nature Resources, FSA2179, May 2015, 6 pages.

Dombrowski, et al., "A Photographic Investigation into The Disintegration of Liquid Sheets", Philosophical Transactions of the Royal Society of London. Series A, Mathematical and Physical Sciences, vol. 247, No. 924, Sep. 20, 1954, pp. 101-130, The Royal Society Publishing.

Dorman, "The Atomization of Liquid in a Flat Spray", British Journal of Applied Physics, vol. 3, Jun. 1952, pp. 189-192.

Ellis, et al., "Dilute Emulsions and Their Effect on the Breakup of the Liquid Sheet Produced by Flat-Fan Spray Nozzles", Atomization and Sprays, vol. 9, No. 4, pp. 385-397, 1999, Begell House, Inc.

Ellis, et al., "How Adjuvants Influence Spray Formation with Different Hydraulic Nozzles", Crop Protection, vol. 18, pp. 101-109, 1999, Elsevier.

Ellis, et al., "The Effect of Some Adjuvants on Sprays Produced by Agricultural Flat Fan Nozzles", Crop Protection, vol. 16, No. 1, pp. 41-50, 1997, Elsevier Science Ltd, Great Britain.

EPO, "Extended European Search Report", App. No. 19210537.7-1110, dated Apr. 2, 2020, 6 pages.

EPO, "Extended European Search Report", App. No. 19210568.2-1001, dated Apr. 3, 2020, 9 pages.

Fraser, et al., "Drop Formation from Rapidly Moving Liquid Sheets", A.I.Ch.E. Journal, vol. 8, No. 5, pp. 672-680, Nov. 1962, John Wiley & Sons.

Guler, et al., "Spray Characteristics and Drift Reduction Potential With Air Induction and Conventional Flat-Fan Nozzles", American Society of Agricultural and Biological Engineers, vol. 50, No. 3, pp. 745-754, 2007.

(56) References Cited

OTHER PUBLICATIONS

Halecky, et al., "Evaluation of a Modified Guar OD Formulation for Spray Drift Mitigation", Journal of ASTM International; vol. 8, No. 10, Aug. 31, 2011, 13 pages.

Halt, "Drift Reduction Agent Product Label", https://s3-us-west-2.amazonaws.com/greenbook-assets/L111240.pdf, Accessed: Feb. 28, 2018, 1 page.

Interlock By Winfield, "Versatile Drift Reduction and Deposition", 2012, 2 pages.

Lhuissier, et al., "Effervescent Atomization in two Dimensions", Journal of Fluid Mechanics, vol. 714, pp. 361-392, 2013, Cambridge University Press.

NA Agro Lab, "Contact Angle and Drave's Wetting Report for DV 5-8135", NA Agro Lab, May 23, 2016, 6 pages.

NA Agro Lab, Solvay Brstol R & I, "DV 5-8135 Physical Property, Compatibility and DRT Data Report", NA Agro Lab, Solvay Bristol R&I, May 6, 2016, 10 pages.

Ng, et al., "Bag breakup of nonturbulent liquid jets in crossflow." International Journal of Multiphase Flow 34 (2008) pp. 241-259., Jan. 1, 2008.

Pandit, et al., "Hydrodynamics of the Rupture of this Liquid Films", Journal of Fluid Mechanics, vol. 212, pp. 11-24, 1990, Great Britain.

PCT, "International Search Report and Written Opinion", Application No. PCT/US2017/068729, dated Mar. 11, 2018, 12 pages.

PCT, "International Search Report and Written Opinion", Application No. PCT/US2019/040002, dated Sep. 12, 2019, 13 pages.

Qin, et al., "Controlling Droplet-Size Distribution Using Oil Emulsions in Agricultural Sprays", Atomization and Sprays, vol. 20, No. 3, pp. 227-239, 2010, Begell House, Inc.

Rhodia, "AG-RHOSPEC 7713 Regulatory Profile Sheet", Apr. 3, 2012, 1 page.

Rhodia, "AG-RHOSPEC® 7713 Product Data Sheet N002372", Aug. 2012, 1 page.

SMBSC, "What you need to know about Spray Adjuvants", www.smbsc.com/pdf/SprayAdjuvants.pdf, Accessed: Feb. 28, 2018, 5 pages.

Solvay, "AG 16098 DV 5-8135 Safety Data Sheet", Solvay, Apr. 26, 2016, 14 pages.

Solvay, "AG-RHOSPEC 7713 Material Safety Data Sheet", Sep. 13, 2013, 10 pages.

Squire, "Investigation of the Instability of a Moving Liquid Film", British Journal of Applied Physics, vol. 4, pp. 167-169, 1953.

Stevens, "Adhesion of Spray Droplet to Foliage: The Role of Dynamic Surface Tension and Advantages of Organosilicone Surfactants", Pestic. Sci. 38, 1993, pp. 237-245.

Winfield Interlock, "Safety Data Sheet", Oct. 1, 2013, 5 pages.

Yarveicy, et al., "Effect of amphoteric surfactant on phase behavior of hydrocarbon-electrolyte-water system-an application in enhanced oil recovery", Journal of Dispersion Science and Technology; vol. 39, No. 4, 2018, pp. 522-530.

Guler, H. et al., "Wind Tunnel Evaluation of Drift Reduction Potential and Spray Characteristics with Drift Retardants at High Operating Pressure5", Journal of ASTM International, vol. 3 No. 5 Paper ID JAI13527; Online at www.astm.org, Feb. 17, 2006, pp. 1-9.

PCT, "International Search Report and Written Opinion", Application No. PCT/US2018/050201, dated Dec. 30, 2018, 8 pages.

PCT, "International Preliminary Report on Patentability" Application No. PCT/US2018/050201, dated Mar. 26, 2020, 7 pages.

Reichard, D. L. et al., "Wind Tunnel Evaluation of a Computer Program to Model Spray Drift", Transactions of the ASAE, vol. 35(3), May 6, 1992, pp. 755-758.

Tomioka, et al., "Multipurpose wind tunnel facility", Translation of JPH0812222, Published May 1996. Translated Jun. 2019. (Year: 1996).

UNC, "Applied Mathematics "The Fluid Lab at Applied Mathematics"", http://web.archive.org/web/20100612024021/http://wwamath.unc.edu/lab, (Accessed on Jun. 12, 2010), 1 pages.

UNC, "Applied Mathematics "Tunnel Picture"", http://www.amath.unc.edu/Faculty/rmm/tunnel.jpg, May 22, 1999, 1 page.

\* cited by examiner

FLOW DIVERTING WIND TUNNEL

CROSS-REFERENCE TO RELATED APPLICATIONS

This application is a continuation of U.S. patent application Ser. No. 16/897,908 filed Jun. 10, 2020, issued as U.S. Pat. No. 11,047,764 on Jun. 29, 2021, which is a continuation of U.S. patent application Ser. No. 15/701,143 filed Sep. 11, 2017, issued as U.S. Pat. No. 10,712,232, on Jul. 14, 2020, the contents of which are herein incorporated by reference in their entirety.

TECHNOLOGICAL FIELD

This application relates to wind tunnel devices, and more particularly to a flow diverting wind tunnel device.

BACKGROUND

Traditionally, wind tunnels are specifically designed as either an open-return tunnel or a closed-return tunnel. Open-return wind tunnels are designed such that the air traveling through the test section of the wind tunnel only passes one time through the measurement area and thereafter is expelled to the environment external to the wind tunnel (e.g., into the room or outdoors). In contrast, closed-return wind tunnels are designed to continuously recirculate the airflow internally within the wind tunnel.

SUMMARY

A wind tunnel device is provided herein that enables selective diversion of airflow within the wind tunnel. The diversion of airflow may enable the wind tunnel device to include a multi-configurable wind tunnel that can be operated as either an open-return wind tunnel or a closed-return wind tunnel. In other words, the wind tunnel device may enable a closed-return wind tunnel to function as an open-return wind tunnel while keeping the benefits of a closed system, and vice versa. Additionally, or alternatively, the diversion of airflow may enable the wind tunnel device to recondition the air within a closed-return wind tunnel. In other words, the wind tunnel device may enable reconditioning of air inside the tunnel quickly without long downtimes. For example, the wind tunnel device may provide a flow path to refresh the airflow within the tunnel, effectively reconditioning the air (e.g., temperature and/or humidity) within the tunnel. Accordingly, the wind tunnel device provided herein can allow the wind tunnel to transform between two modes of operation and/or to refresh/recondition the air within the tunnel.

The wind tunnel device may use existing structure (e.g., infrastructure) of a closed-return wind tunnel to redirect the flow of the wind tunnel and transform the flow path from a closed-return circuit to an open-return circuit, and vice versa. Existing structure of a closed-return wind tunnel includes, for example, corner turning vanes and a tunnel fan. The corner turning vanes may be actuatable between open and closed positions, and the tunnel fan may be operable to actuate baffles, such as dampers, to redirect the flow created by the tunnel fan from a closed-loop or recirculating design, into an open-loop design. In this form, the tunnel fan draws air from the outside, passes the air through the test section, and exhausts the air back outside.

According to one implementation, a wind tunnel device includes a closed-loop tunnel, a fan positioned in the tunnel and configured to circulate air through the tunnel, one or more movable members positioned in the tunnel, a supply duct selectively in fluid communication with the tunnel, and an exhaust duct selectively in fluid communication with the tunnel. The one or more movable members being movable between a first position in which the one or more movable members permit re-circulation of air through the tunnel and a second position in which the one or more movable members inhibit re-circulation of air through the tunnel. The supply duct is configured to supply air to the tunnel and the exhaust duct is configured to permit air to flow out of the tunnel via the fan in response to the one or more movable members being moved to the second position.

According to another implementation, a method of operating a wind tunnel includes re-circulating air through a tunnel via a fan positioned in the tunnel, moving one or more movable members positioned in the tunnel from a first position in which the one or more movable members permit re-circulation of air through the tunnel to a second position in which the one or more movable members inhibit re-circulation of air through the tunnel, supplying air to the tunnel via a supply duct in response to the one or more movable members being moved to the second position, and permitting air to flow out of the tunnel via an exhaust duct in response to the one or more movable members being moved to the second position.

In yet a further implementation, a method of operating a wind tunnel includes operating the wind tunnel as a closed-loop wind tunnel in which air is re-circulated through the wind tunnel via a fan positioned in the wind tunnel and air is directed around a corner of the wind tunnel via turning vanes, rotating the turning vanes to seal the corner of the wind tunnel to inhibit re-circulation of air through the wind tunnel, and operating the wind tunnel as an open-return wind tunnel in which air enters the wind tunnel via a supply duct and exits the wind tunnel via an exhaust duct.

DETAILED DESCRIPTION

Research has shown that the most reliable data for spray particle analysis comes from using a wind tunnel to move fine spray particles away from an analysis device to prevent duplicate measurements. This disclosure relates, in part, to low speed wind tunnels used for analysis of spray particle size.

Wind tunnel devices provided herein may provide for accurate laser analysis of spray particles, which may be used for: product development (such as spray tip development); formulation development (such as active ingredients, e.g., herbicides, and adjuvants, e.g., drift reducer compositions); product label development; drift reduction technology development (e.g., spray tips, active ingredients and adjuvants); and grower and applicator training and education. Wind tunnel devices may accordingly be configured to test a variety of herbicide active ingredients, adjuvants, spray tips, and combinations of these to evaluate potential off-target movement.

FIG. 1 shows a perspective view of one embodiment of a wind tunnel device 10 according to certain implementations. The wind tunnel device 10 may include a series of segments or sections. Each of the sections may include a first end and a second end, such as a ceiling and a floor, respectively, as well as sidewalls therebetween. The sections may be generally rectangularly shaped and open at two sides to enable the sections to be interconnected. Some of the sections may be configured as corners and may include two open sides arranged at a right angle. For example, as shown in FIG. 1, the wind tunnel device 10 may include a fan 12, a first section 14, a second section 16, and a third section 18. The fan 12 and the three sections 14, 16, 18 may form a generally rectangular footprint for containing the airflow. A tunnel 19 may be defined within the volume enclosed within an interior defined by the fan 12 and the three sections 14, 16, and 18 of the wind tunnel device 10 and may enable airflow to pass therethrough. The tunnel 19 may be cyclical such that a volume of airflow moves from the fan 12 sequentially into the sections 14, 16, 18, and from section 18, the airflow may re-circulate back into the fan 12 without allowing the passage of particulates or airflow to the exterior of the device. Providing a cyclical circuit enables the airflow to be reused, which reduces the amount of air exiting the wind tunnel device 10 and minimizes particulate exposure. In some implementations, seals may be provided between the sections to further minimize the possibility that particulates or circulating airflow will be transported outside the wind tunnel device 10.

The fan 12 of the wind tunnel device 10 may include a motor 20 configured to drive the fan 12, which may be communicatively coupled to a control system or an operating console of the wind tunnel device 10 (see FIG. 7). In a particular embodiment, the fan 12 is manufactured by Twin City Fan M/N (TSL SW Model 542), and is of the inline centrifugal type. As shown in FIGS. 1 and 5, the fan 12 may be joined to the first section 14 by a first duct 22 and to the third section 18 by a second duct 24. In one embodiment, the motor 20 is a 7.5 horsepower motor that may be configured to generate wind speeds of between about 1 and 20 miles per hour at a spray tip 25 (described below), or between about 1 and 14 miles per hour. Those skilled in the art will appreciate that a wide variety of commercially available fans with horsepower requirements ranging from 5 horsepower to 30 horsepower, or at about 5, 7.5, 10, 15, 20, 25, 30 horsepower may be used in connection with the wind tunnel device 10. Typically, the wind speed in the other portions of the flow circuit defined by the wind tunnel device 10 is equal to that of the test section, which is described further below in connection with the second section 12. However, in some implementations, flow may be expanded through a portion of the flow circuit and may be contracted through a duct or other airflow control device upstream from the test section.

The first section 14 of the wind tunnel device 10 may include a first corner 26, a first middle section 27 and second corner 28. As shown in FIGS. 1, 2 and 5, the first corner 26 may be joined to the second corner 28 by way of the first middle section 27 and may form one side of the generally rectangular shape of the wind tunnel device 10. A portion of the tunnel 19 is formed within the volume enclosed by the first section 14. As shown in FIGS. 1, 2, 3 and 5, each corner 26, 28 is generally rectangular, may define a generally rectangular cross-section and may define openings at right angles relative to one another. As shown in FIG. 5, two adjacent sides of a corner 26, 28 form a generally right angled surface at the exterior of the wind tunnel device 10. In order to limit wind resistance due to such angles, each of the first and second corners 26 and 28 may include turning vanes 29 within an interior of the corners 26, 28. The turning vanes 29 may be configured as vertically extending members joined to top ends 26*a*, 28*a* and bottom ends 26*b*, 28*b* of the first and second corners 26 and 28, respectively. In some implementations, the turning vanes 29 may be configured as louvers or aerodynamic arcuately shaped vanes. In more specific implementations, the turning vanes 29 may be constant-arc vanes (e.g., high efficiency profile (HEP) turning vanes manufactured by Aerodyne). Other turning vane geometries may include, but are not limited to, single thickness circular arc designs, multiple thickness circular arc designs, single thickness airfoil designs, and multiple thickness airfoil designs. In some implementations, the turning vanes 29 may be spaced intermittently along a diagonal line from the interior of the corner to the exterior of the corner 26, for example, extending between internal intersection points where the outside exterior walls 26*c*, 26*d* meet and at which internal exterior walls 26*e*, 26*f* meet. The turning vanes 29 may be configured to provide minimum loss and disturbance of airflow as the air turns the corner channels. That is, the turning vanes 29 may be placed at generally right angled surfaces within the corners 26, 28 to reduce wind resistance and direct airflow away from the right angled surfaces and some turning vanes 29 may be spaced apart within the corner 26, 28 to more evenly direct the airflow. In some implementations, airflow may be turned within the wind tunnel device without any turning vanes.

As shown in FIGS. 1, 3, 5 and 6, the second section 16 of the wind tunnel device 10 may be configured as a generally rectangular cabinet and may define the test section 38. The test section 38 may join to the second corner 28 of the first section 14 and to a first corner 30 of the third section 18. A portion of the tunnel 19 is formed within the volume enclosed by the test section 38.

The test section 38 of the second section 16 may generally define another side of the rectangular shape of the wind tunnel device 10. The rectangular test section 38 may be configured to include a first portion 39 with a honeycomb air stabilizer unit 40 (not shown), a traversing arm housing 42 with a traversing arm 43 holding the spray tip 25 (FIG. 6), a second portion 44 with a first expansion cutout 45, a second expansion cutout 46, a laser mount 48 that may hold a laser 49, glass wall sections 50 and a spray particle scrubber 51. The test section 38 may have an area that is 6 feet high by 3 feet wide by 12 feet long. In some implementations, the test section 38 may have various dimensions, and preferably the test section includes a length of at least 36 inches, and a width and a height that are at least one meter.

The first portion 39 of the test section 38 may be configured to accommodate movement of the traversing arm 43, described below. In addition, the first portion 39 may generally define a rectangular cross section with a ceiling at the upper end 38a of the test section 38, a floor at the lower end 38b of the test section 38, and a pair of opposing sidewalls arranged therebetween. In some implementations, glass wall sections 50 may be provided as the sidewalls of the first portion 39.

The honeycomb stabilizer unit 40 may generally be placed at the entrance to the test section 38. For example, the honeycomb stabilizer unit 40 may generally be positioned at the interface where the second corner 28 of the first portion 14 joins to the rectangular test section 38. The unit may include a honeycomb structure that allows air to pass through the structure, and may facilitate a more uniform and straight airflow from the second corner 28 into the test section 38. In one embodiment, the air stabilizer unit, or flow conditioner, may ensure both straightness and uniformity of the airflow as it passes the spray tip. The honeycomb stabilizer unit 40 may have a size and shape similar or the same as a cross-section of the wind tunnel, and may include a honeycomb structure with cells of various configurations. For example, a series of hexagonally-configured cells may each have dimensions of about 2 inches by about 0.25 inches. In addition to the hexagonal cell geometry, the cells may have square and round geometries, and may include cells sizes adapted for flow conditioning that may include a thicknesses likely ranging between 1" up to 4"×¼", ⅜", ½", ¾" and 1". Materials that may be used to fabricate the cells may include, but are not limited to, aluminum, polycarbonate, PVC, ABS, polypropylene, stainless steel, and titanium.

Figure 1:
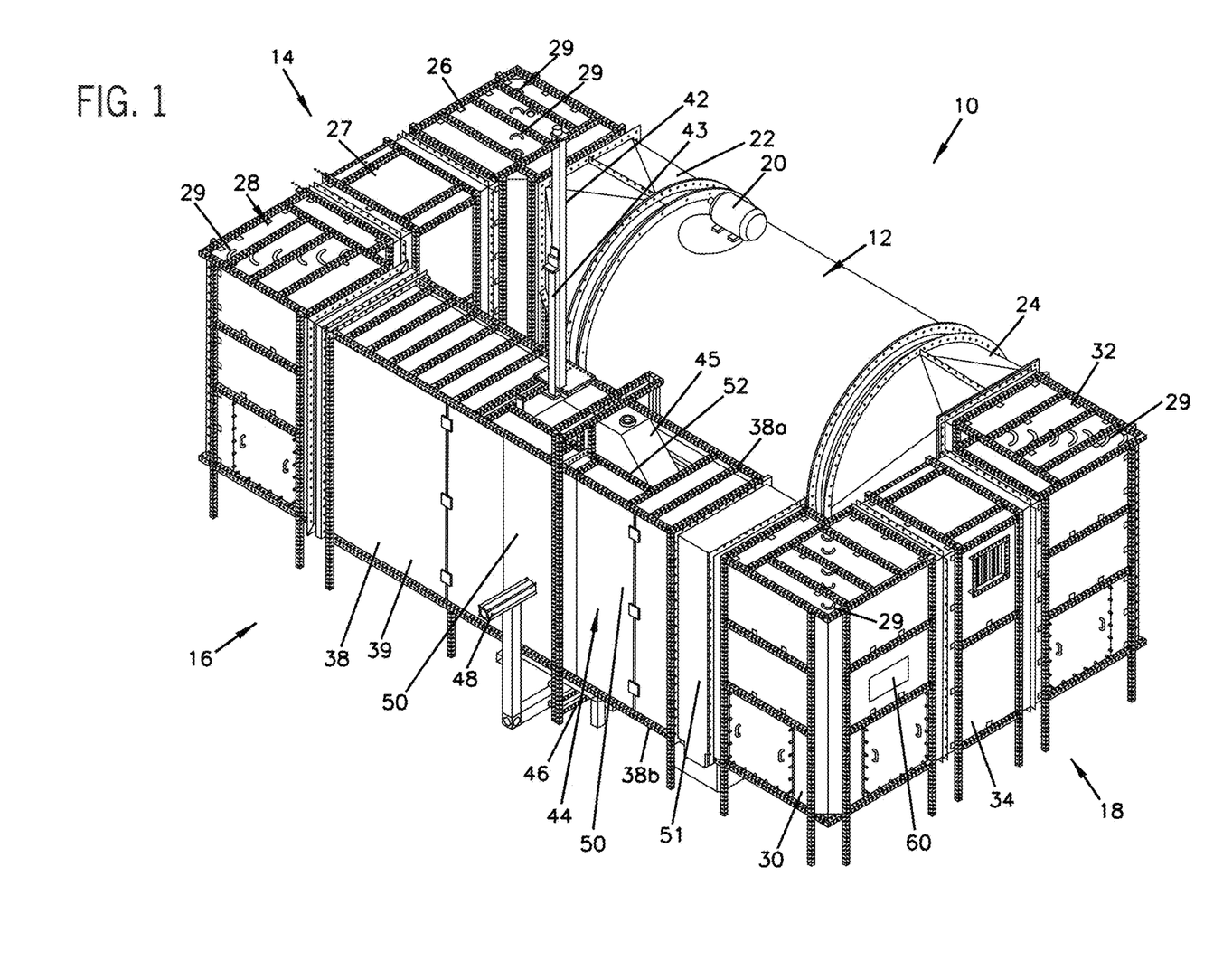
FIG. 1 is a perspective view of one embodiment of a wind tunnel device according to certain implementations.
Figure 2:
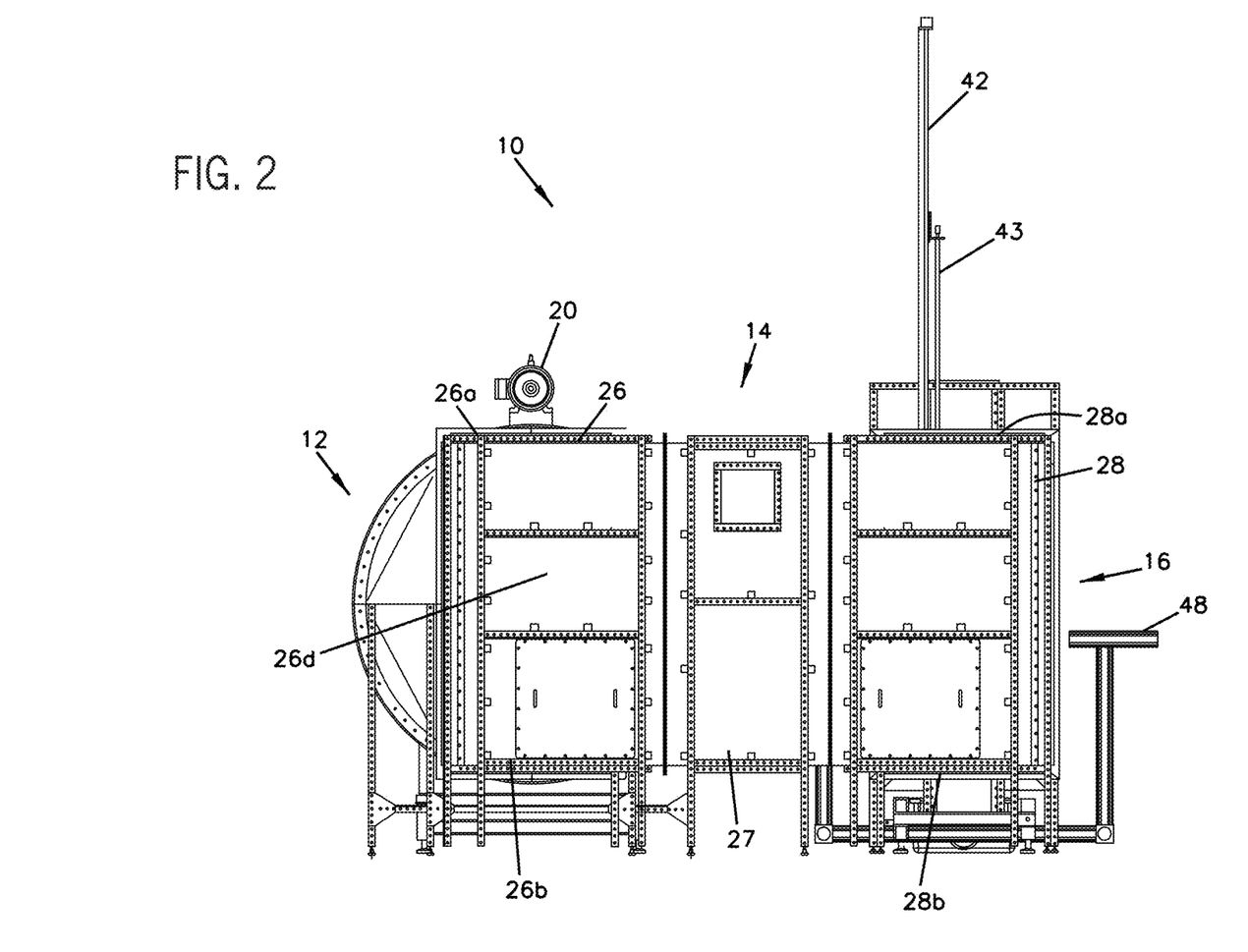
FIG. 2 is a left side view of the wind tunnel device of FIG. 1.
Figure 3:
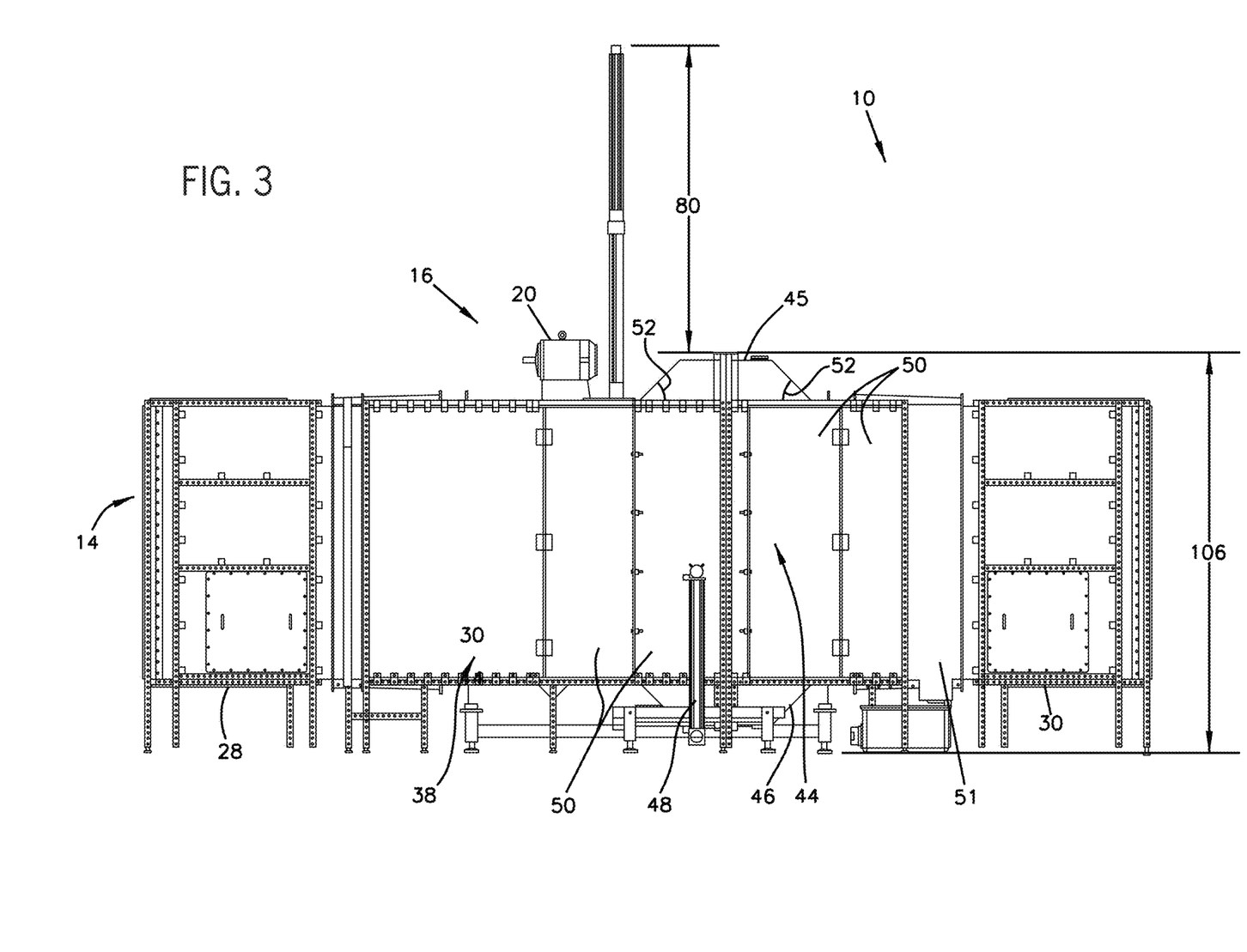
FIG. 3 is a front view of the wind tunnel device of FIG. 1.

The traversing arm housing 42 may be joined at the first portion 39 at a first end 38a of the test section 38, as shown in FIGS. 1 and 3. The traversing arm housing 42 may be configured to guide the traversing arm 43 into the space defined by the first portion 39 of the test section 38. In some implementations, the traversing arm housing 42 may include a track for guiding the traversing arm 43 and a seal arranged at an opening where the traversing arm 43 enters the test section 38. The seal between the housing 42 and the traversing arm 43 ensures spray particulates do not escape the test section during spraying and testing.

The traversing arm 43 may extend from the traversing arm housing 42 and may receive the spray tip 25. In some implementations, the spray tip 25 is offset from the traversing arm 43, for example by about 6 to 8 inches. In this example, the spray tip 25 may be coupled to the traversing arm 43 via a conduit such as a rigid conduit projecting horizontally from the traversing arm 43 and fluidly coupled to the spray tip 25. In further implementations, the traversing arm 43 or the conduit is adapted for the interchangeable attachment of spray tips and may include a supply line coupled to a fluid delivery system for delivering fluid to the one or more spray tips joined thereto. The spray tip 25 may be configured to emit a spray forming spray particulates, and the spray tip 25 may be selected from a variety of spray tips (e.g., nozzles) such as those used in agricultural applications.

The traversing arm 43 may be controllably lowered and raised between the first end 38a of the test section 38, which may be proximate a ceiling of the first portion 39 of the test section 38, and a second end 38b of the test section 38, which may be proximate a floor of the first portion 39. This movement may be through the use of a stepper motor (not shown), which moves the traversing arm 43 along the traversing arm housing 42.

Figure 6:
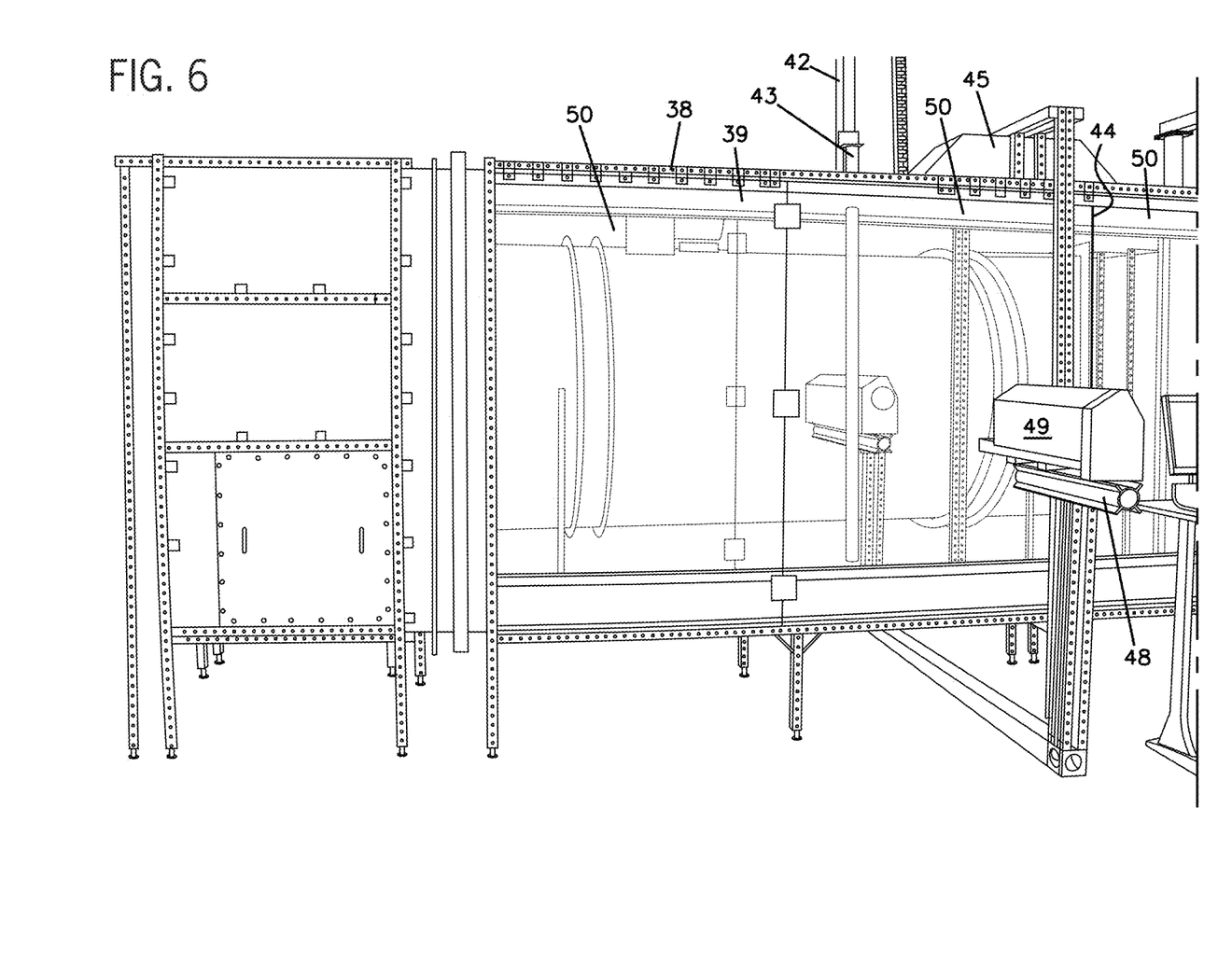
FIG. 6 is a front left side view of the wind tunnel device of FIG. 1.

In some implementations, the traversing arm 43 may be shaped similar to an airplane wing as shown in FIG. 6. For example, an airfoil shaped traversing arm 43 produced by Carlson Aircraft. Some suitable airfoil shapes for the arm 43 may be symmetrical circular arc shapes, symmetrical polynomial generated shapes, symmetrical matched ellipse shapes, and symmetrical NACA (National Advisory Committee for Aeronautics) airfoil shapes. The airfoil shape of the traversing arm 43 may provide less disruption to the airflow within the test section 38. However, other shapes may also be used for the traversing arm 43. In further implementations, the traversing arm housing 42 and traversing arm 43 may be fully enclosed within the test section 38. In this implementation, the traversing arm 43 may move along the traversing arm housing 42 within the test section 38, which may further minimize the possibility that particulates from the spray tip 25 will be transported outside the wind tunnel device 10.

The second portion 44 of the test section 38 may be configured as a fully enclosed testing region of the test section 38 where the spray particulates are analyzed. The second portion 44 includes a first expansion cutout 45 and a second expansion cutout 46 protruding outwardly from the first and second ends 38a, 38b of the test section 38 proximate a floor and a ceiling of the test section 38, respectively. The second portion 44 of the test section 38 with the expansion cutouts 45, 46 accordingly defines a space with cutouts forming an angled ceiling and an angled floor separated by sidewalls. The sidewalls of the second portion 44 may include the glass wall sections 50 in an area proximate where the spray analysis is conducted, described below. The configuration of the second portion 44 of the test section 38 accommodates the spray angles provided by the spray tip 25 joined to the traversing arm 43. In contrast, the space defined by the first portion 39 of the test section 38 may be unable to accommodate the spray angles provided by the spray tips 25 due to height limitations. For example, because the first portion 39 of the test section 38 is configured to allow the traversing arm 43 to translate between the first and second ends 38a, 38b of the test section 38, angled spray emitted from the spray tip 25 may otherwise contact the first and second ends 38a, 38b of the cabinet 30, e.g., the first portion 39 may define an area that is smaller than an area covered by the angled spray particulates. The expansion cutouts 45, 46 downstream from the spray tips 25 are configured to minimize such contact by the spray particulates.

The expansion cutouts 45, 46 may be configured as a five wall expansion piece with an opening for positioning over an opening in an upper or lower end 38a, 38b of the test section 38. Walls of the expansion cutouts 45, 46 include angled sides that define an expansion angle 52 that is approximately equal to the widest spray angle emitted by the spray tip 25 used in connection with the traversing arm 43. In some implementations the spray tip 25 may deliver a maximum spray angle of 140° and the expansion cutouts 45, 46 may be configured to accommodate this or other maximum spray angles. In some implementations, the expansion angle for the cutout may be about 45°. However, the expansion angle may vary from about 10° to about 90°. The depth of the expansion cutouts may be about 12 inches, and the size of the rectangles cut into the test section wall for receiving the expansion cutout may be about 12 wide by about 48 inches long. In some implementations, the cutouts 45, 46 may be configured with the same shape. The first expansion cutout 45 may include a drip tray that prevents any spray that impinges on the test section walls from dripping through the measurement area. The second expansion cutout 46 may include a drain for draining the collected liquid. In some implementations, the first expansion cutout 45 may define a small opening that may generally be capped, which may allow for a suction system to condition the flow past the first expansion cutout 45, for example.

The expansion cutouts 45 and 46 in combination with the second portion 44 of the test section 38 may be configured to allow the spray from wide and narrow angle spray tips 25 to be analyzed within the second portion 44 of the test section 38 without the spray bouncing off or collecting and dripping from the ceiling and the floor of the test section 38. For example, as a wide angle spray tip 25 is spraying a fluid (e.g., a herbicide) when it is at the top end 38a of the test section 38, the spray pattern of the herbicide may follow one or both of the angled expansion cutouts 45, 46 and the spray pattern may be allowed to flow along the expansion cutouts 45, 46 and the second portion 44 so that the spray pattern may be analyzed by the laser 48 and the particulates may exit the second portion 44. For example, the configuration of the expansion cutout 45 may prevent some droplets from forming on the ceiling of the first end 38a of the test section 38 above the space covered by the laser 49 by allowing the droplets to pass into and out of the expansion cutout 45. Similarly, the expansion cutout 46 may be configured at an angle at the second end 38b of the test section 38 to prevent splatter from the herbicide hitting the floor of the second end 38b of the test section 38 and enter the space covered by the laser 49 by allowing the droplets to pass into and out of the expansion cutout 46. The expansion cutouts 45, 46 may thus be configured to limit measurement errors due to errant drops (e.g., droplets that drip down from walls or bounce off of walls) passing through the laser path such as preventing fluid drops from forming as a result of hitting the ceiling or floor of the top and bottom ends 38a, 38b of the test section 38 and entering the space covered by the laser 49. Further, while some particulates may contact the drip tray of the first expansion cutout 45, the drip tray may prevent drop formation and channel the particulates downstream from the testing region thereby preventing such drops from falling in the space covered by the laser. Other particulates contacting the second expansion cutout 46 may be collected and drained.

The laser mount 48 of the test section 38 may be positioned proximate the second portion 44 of the test section 38 and may be configured to receive a laser 49 or other analysis devices. The laser mount 48 may be movable horizontally and/or vertically at least along the glass sections 50 of the second portion 44 to enable the laser 49 to measure spray particulates from various types of spray tips. For example, some spray tips 25 may deliver a sheet of liquid from an orifice and the sheet may break apart into spray particulates at a certain distance away from the orifice of the spray tips 25. In this example, the laser mount 48 and the laser 49 may be moved horizontally to a position along the second portion 44 corresponding to a location downstream from the nozzle where the spray particulates form. In some implementations, the laser mount 48 may translate horizontally from 0 to 24 inches from the spray tip, 2 to 18 inches from the spray tip or any combination thereof. In some implementations, the laser mount 48 may translate vertically while the spray tips remain stationary. While the analysis device described herein is a laser, it will be appreciated that other analysis devices may be used such as video imaging.

The glass sections 50 of the test section 38 may be configured to enable analysis, such as laser analysis, of the spray particulates without forming openings within the sidewalls of the test section 38. The glass used in the wind tunnel device 10 may be a ⅜" nominal thickness, low-iron, annealed, soda-lime glass. Acceptable glass configurations for the test section may include, but are not limited to, ¼" nominal thickness, ⅜" nominal thickness, and ¾" nominal thickness, and substantially equivalent metric sized materials. Acceptable compositions for the glass may include, but are not limited to, soda-lime, low-iron soda lime, and borosilicate. In some implementations, fused quartz and sapphire may be used in areas to where the laser analysis takes place. Low iron glass may be preferred due to its increased optical transmission. In addition, available tempers are annealed, strengthened, and tempered, but annealed glass is preferable due to its low optical distortion for the laser. Some installations may use tempered glass, for example, as a safety precaution. By analyzing the spray particulates within an environment separate from the user and from the analysis device, analysis may be performed by the user without risking exposure to potentially harmful chemicals and the analysis device remains free of spray particulates, which may facilitate avoiding inaccurate measurements. While providing glass sections 50 along sidewalls of the second portion 44 of the test section 38 is preferred, other areas of the test section 38 may also include glass sections. For example, as shown in FIG. 6, the first portion 39 of the test section 38 may include sidewalls formed of glass sections 50 such as optical glass walls configured to enable the user to view movement of the traversing arm 43. In some implementations, the glass sections 50 may be hinged to allow access to the interior of the test section 38, for example, to allow attachment of spray tips 25 and maintenance.

A spray particle scrubber 51 of the test section 38 may be joined between the second portion 44 of the test section 38 and the third corner 30 of the third section 18. In some implementations, the spray particle scrubber 51 may be configured to collect the droplets exiting the second portion 44 of the test section 38 and may prevent the droplets from continuing through the tunnel 19 defined by the wind tunnel device 10. With the use of a spray particle scrubber 51, the air may be reused and provided to the fan 12, for example. In one embodiment, the scrubber 51 may be configured as a mist extractor. In another embodiment, the scrubber 51 may be 99.7% effective at removing particles greater than 5 μm diameter. For example, the spray particle scrubber 51 may use a series of angled channels to change the flow path of the particles, allowing them to settle out and run down the channels, into the waste disposal unit.

Figure 7:
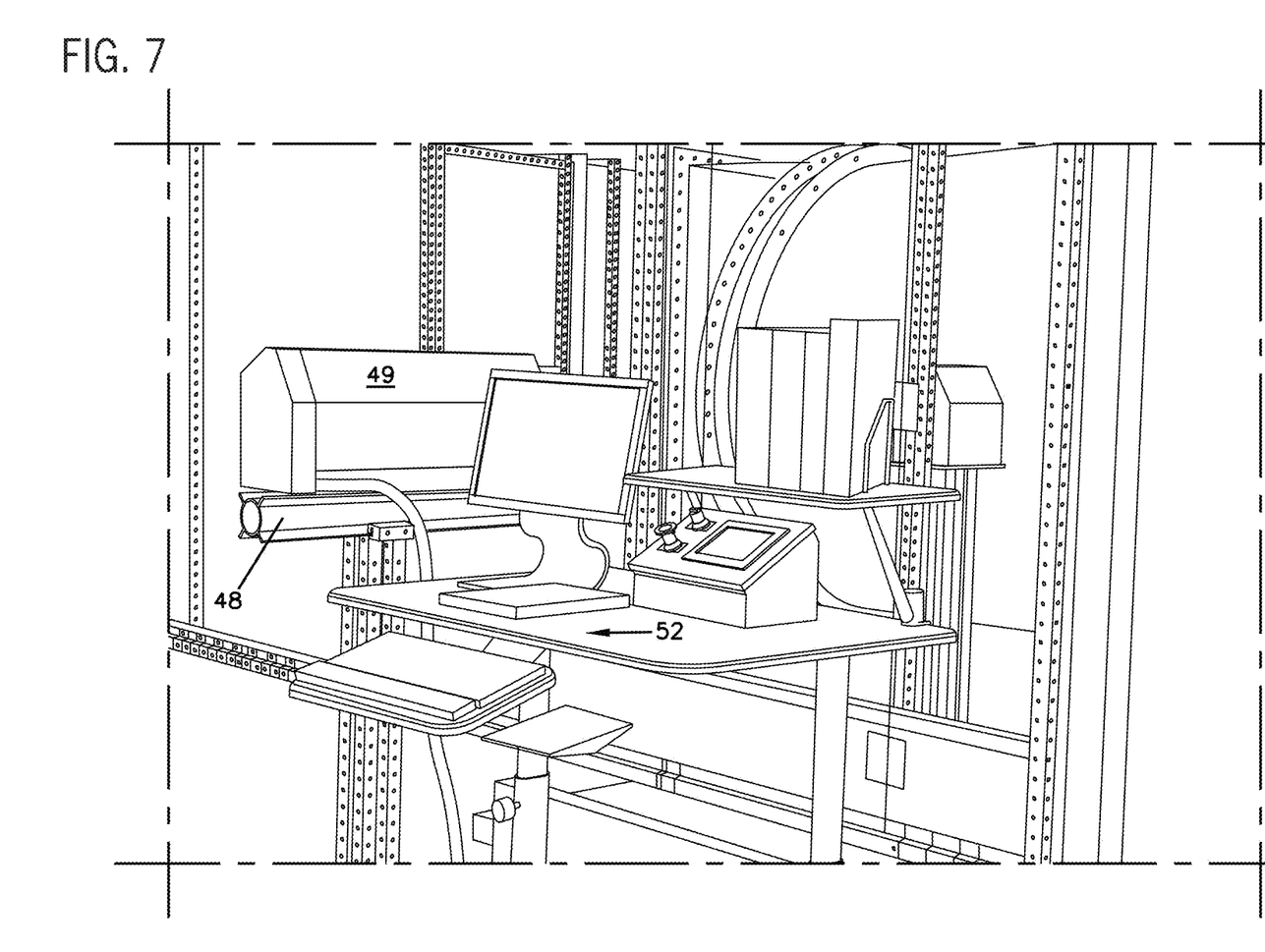
FIG. 7 is a view of an operating console that may be provided in connection with the wind tunnel device of FIG. 1.

As shown in FIG. 7, a computer 52 may be configured as an operating console for the wind tunnel device 10 and may be communicatively coupled thereto. The computer 52 may include a processor, a memory and a network connection. In some implementations, the computer 52 may be used to operate the traversing arm 43, the laser mount 48, the laser 49, a fluid delivery system for delivering fluid to the spray tips 25 and so on. For example, using the computer 52, an operator may adjust the position of the laser mount 48 and the laser 49 horizontally and vertically. This may protect the laser 49 from being handled while readjusting and repositioning the laser 49. In some implementations, the laser 49 may be operated using proprietary Sympatec software, WINDOX provided on the computer 52. In addition, the computer 52 may be configured to control the traversing arm 43 to lower and raise the spray tip 25 joined thereto. A traversing arm motor (not shown) may also be operated using software on the computer 52.

Figure 4:
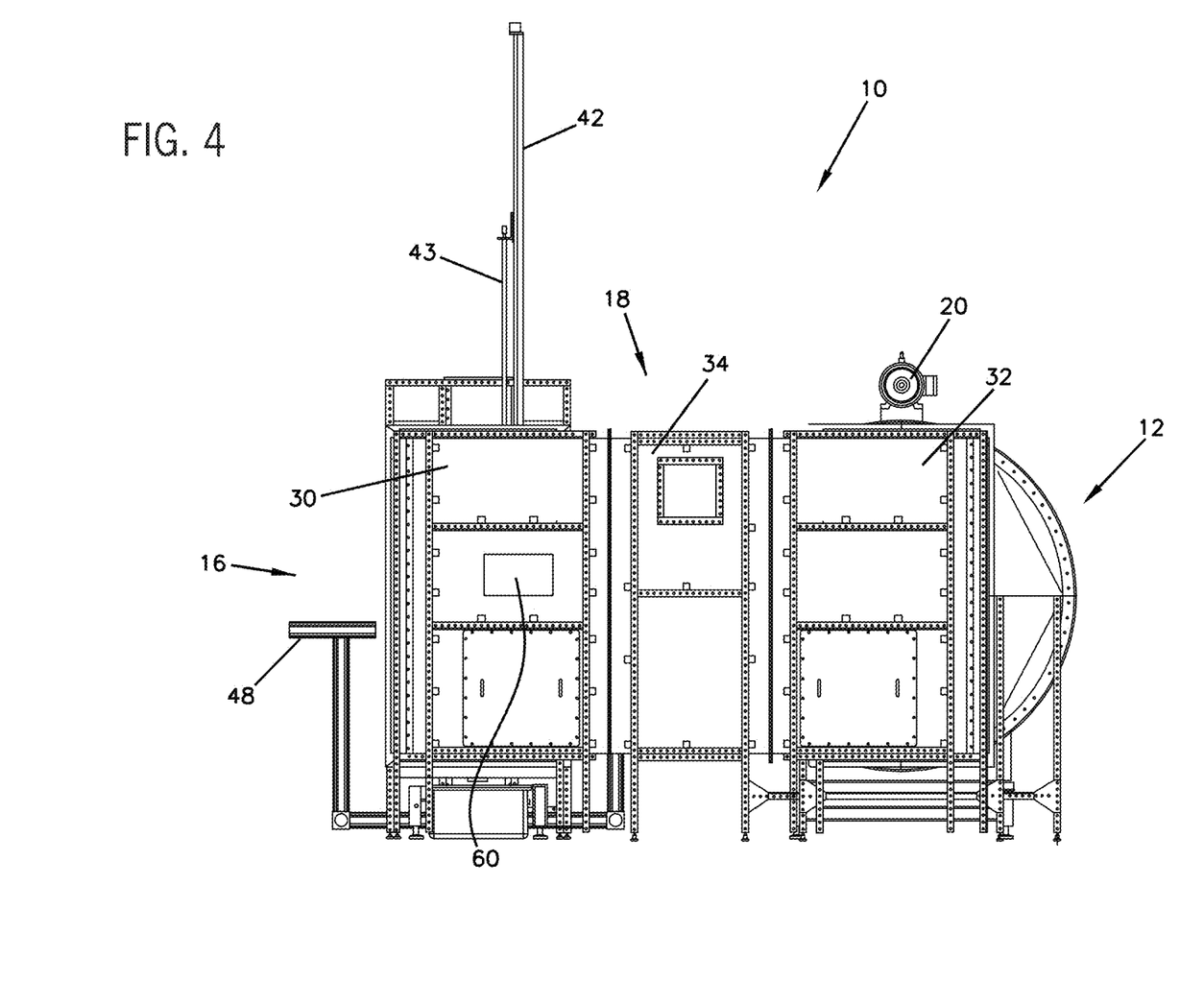
FIG. 4 is a right side view of the wind tunnel device of FIG. 1.

As shown in FIGS. 1 and 4, a control box 60 is mounted to the exterior of the wind tunnel device 10 and may be used to control the wind speed and a waste pump (not shown). The control box 60 may be operated using the computer 52 or may be operated separately therefrom.

Figure 5:
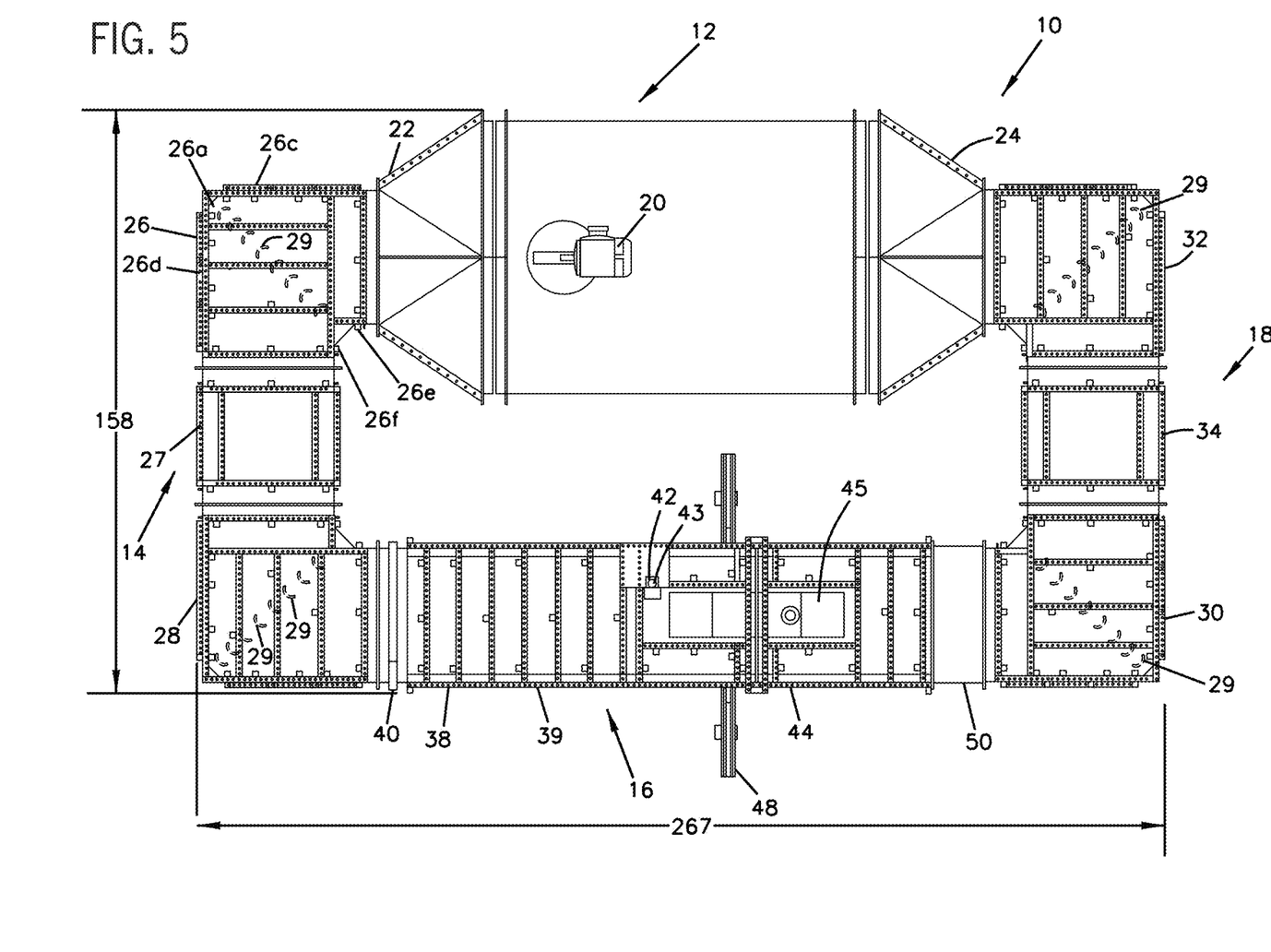
FIG. 5 is a top plan view of the wind tunnel device of FIG. 1.

As shown in FIGS. 1, 4 and 5, the third section 18 of the wind tunnel device 10 may include a third corner 30 and a fourth corner 32 connected by a second middle section 34. As shown in FIG. 5, the third corner 30, the fourth corner 32, and the second middle section 34 may define another side of the generally rectangular shape of the wind tunnel device 10. A portion of the tunnel 19 is formed within the volume enclosed by the third section 18. Similar to the first and second corners, each of the third and fourth corners 30 and 32 may include turning vanes 29. The third section 18 provides a connection between the fan 12 and the second section 16 to enable airflow to be re-circulated within the wind tunnel device 10. In some implementations, an exhaust system may be joined to the third section 18 to provide for safe removal of vapors or other contents in the airflow prior to re-circulating the airflow to the fan 12.

The wind tunnel device 10 disclosed herein provides several advantages over prior approaches. Because the device 10 is configured to re-circulate airflow, ambient air (e.g., air from an external environment in varying climates) need not be pumped into the device 10 from external sources, or at least a reduced amount of air is pumped into the device. For example, during summer and winter months when ambient temperatures are warm or cold, air within the device 10 may be reused, which avoid cooling and heating airflow prior to its introduction into the device 10. A further advantage provided by the device 10 is the ability to provide the laser in a separate environment from the interior of the device. This prevents the laser from fouling from spray particulates. In addition, because the laser may be mounted to the laser mount 48, the laser may be moved to multiple positions, which is in contrast to prior approaches in which lasers were statically mounted within a chemical hood. Yet another advantage provided by the device 10 is the ability to move the spray tip 25 within the device, including use of wide angle spray tips (110 to 140°) without fouling the test section. This differs from prior approaches in which the spray tip is mounted in one position, which may be problematic for leveling. Another advantage of the device is that the fully enclosed test chamber, facilitated by the optically clear glass, allows safe testing of active pesticide products.

Implementation of Use

In one implementation of use, the fan 12 may be operated by the motor 20 to force air through the tunnel 19 defined by the wind tunnel device 10. A spray tip 25 is attached to the traversing arm 43 of the test section 38. A conduit system adapted to transport fluids delivers fluid to the spray tip 25 to be sprayed therethrough. In some implementations, fluid may be forced to travel through the conduit system using an air compressor, pumps and so on. For example, the fluid to be delivered to the spray tip 25 may be tank mixed and pressurized within the tank, the conduit system or both. The conduit system may be coupled to a flow meter in order to measure the flow rate and pressure of the fluid passing therethrough prior to exiting the spray tip 25. In general, the spray tip 25 configuration determines the flow rate and the pressure of the exiting spray. The use of a flow meter provides confirmation that the fluid passing through the conduit system is moving properly, or so that any pressure drops may be accounted for when analyzing the spray exiting the spray tip 25. This enables the user to comply with ASAE/ANSI S572.1 test standard for quality control and size classification of agricultural nozzles, which may vary in quality when purchased from the manufacturer.

Using a computer 52, the traversing arm 43 is vertically lowered and raised within the first portion 39 of the test section 38 so that that spray tip 25 travels from the first end 38a of the test section 38 to the second end 38b of the test section 38. A fluid, such as an herbicide, is sprayed and the airflow passes the spray tip 25 at between 1 and 14 miles per hour. The spray tip 25 delivers spray at about a 110° spray angle, which may exit the spray tip in a vertical orientation. However, the spray angle delivered may exceed 140°, for example, depending on the spray tip and fluid sprayed therefrom.

The airflow carries spray particulates from the spray tip 25 into the second portion 44 of the test section 38 with the first and second expansion cutouts 45, 46. The expansion cutouts 45, 46 of the second portion 44 may substantially prevent droplets from forming on the ceiling above the space covered by the laser 49, and the expansion cutout 46 prevents droplets from bouncing off the floor and into the space covered by the laser 49. In some cases, the spray area may be larger than the second portion 44 of the test section 38 with the first and second expansion cutouts 45, 46, and may impinge upon the test section floor and ceiling but the particulates may be collected in a drip pan and channeled away from the test section. Prior to measurement of the spray particulates, the computer 52 is used to position the laser 49. The computer 52 is used to collect readings and determine particle size, which may then be analyzed. In some embodiments, the analysis may be used to classify the spray particle size as "Very Fine," "Fine," "Medium," "Coarse," and "Very Coarse."

The spray particulate measurements primarily may be taken while traversing the arm vertically up or down. Generally, for full-pattern analysis, the spray pattern measured during the run must clear the laser measurement area, prior to and after the run. The laser analysis may be triggered by the spray entering the test area and stopped when the spray exits the test area.

The spray can also be measured from a static position in a variety of orientations for other types of analysis. The wind tunnel device 10 provided herein is particularly useful for identifying spray particulates of various sizes, including particulates having a size limit of less than 150 μm and less than 105 μm.

The wind tunnel device 10 provided herein, with the laser mount 48 proximate the glass sections 50 of the second portion 44, along with the expansion cutouts 45, 46, may enable the device 10 to deliver airflow past the spray tip 25 at a speed of between about 1 and 14 miles per hour, which corresponds to low testing speeds. Using low testing speeds, the laser 49 may accurately detect the particle sizes of the spray particulates within the testing region.

In addition, the results of the laser 49 analysis may provide accurate results because the expansion cutouts 45, 46 may prevent errant drops from passing through the path of the laser, described above.

Providing glass sections 50 proximate the laser mount 48 enables the laser 49 to analyze the spray particulates without the particulates contacting the laser 49. Users of the wind tunnel device 10 are also protected from exposure to the spray particulates due to the enclosed space formed by the series of joined segments forming the wind tunnel device 10.

The cyclical or rectangular shape of the wind tunnel device 10 further provides a system that re-circulates airflow, as described above. The re-circulated airflow entering the fan 12 may be clean using the spray particle scrubber 51 positioned downstream from the testing region 44 and upstream from the fan 12.

Flow Diverting Wind Tunnel

Traditionally, wind tunnels are designed as either open-return or closed-return wind tunnels. In open-return wind tunnels, air traveling through the test section only passes one time through the test section and is expelled to the environment external to the wind tunnel device (e.g., into the room or outdoors). In contrast, closed-return wind tunnels continuously recirculate airflow internally within the wind tunnel.

Figure 8:
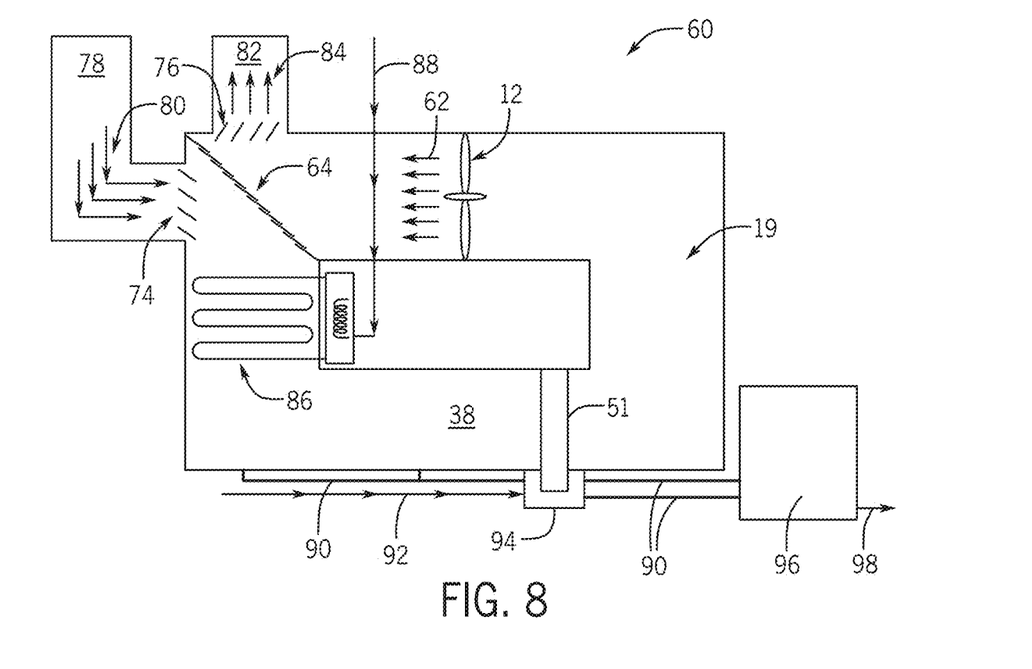
FIG. 8 is a schematic view of one embodiment of a wind tunnel device in an open-return configuration according to certain implementations.
Figure 10:
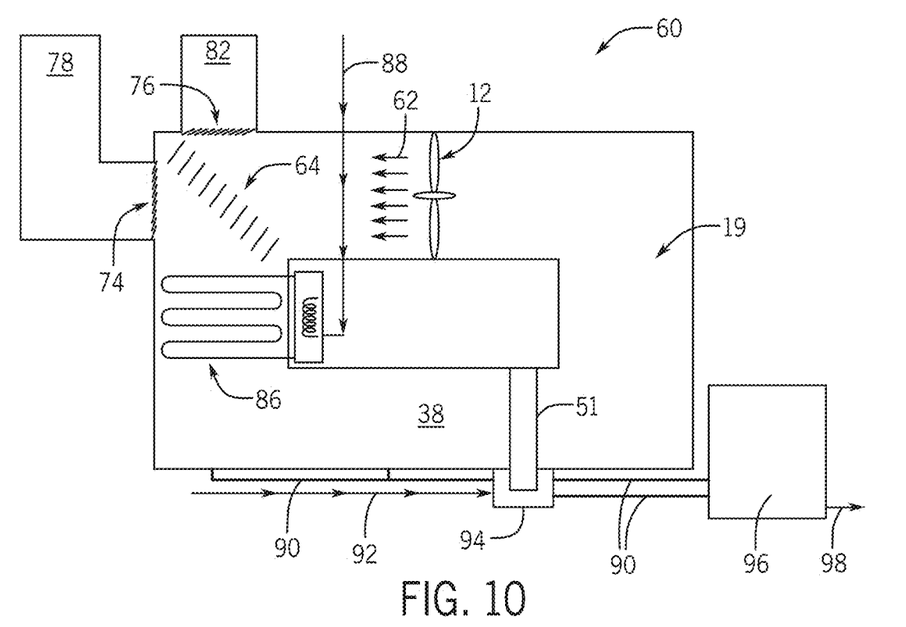
FIG. 10 is a schematic view of the wind tunnel device of FIG. 8 in a closed-return configuration.

Referring to FIGS. 8 and 10, a flow-diverting or multi-configurable wind tunnel device 60 is illustrated. The wind tunnel device 60 includes substantially the same features and operation as wind tunnel device 10 depicted in FIGS. 1-7. Accordingly, the preceding discussion of the features and operation of the wind tunnel device 10, as depicted in FIGS. 1-7, should be considered equally applicable to wind tunnel device 60 depicted in FIGS. 8 and 10, except as noted in the following discussion pertaining to the wind tunnel device 60.

The wind tunnel device 60 illustrated in FIGS. 8 and 10 may be configurable as an open-return or closed-return wind tunnel. In FIG. 8, the wind tunnel device 60 is configured as an open-return or linear wind tunnel in which air enters the tunnel 19, passes through the test section 38 only once, and exits the tunnel 19. In FIG. 10, the wind tunnel device 60 is configured as a closed-loop or recirculating wind tunnel in which air continuously recirculates through the test section 38.

Referring to FIG. 10, the flow-diverting wind tunnel device 60 is configured as a recirculating wind tunnel in which airflow (represented by arrows 62 in FIG. 10) is circulated through the test section 38 via a fan 12. The fan 12 may be coupled with a motor 20 (see FIG. 5) configured to drive the fan 12. The motor 20 may be communicatively coupled to a control system or an operating console of the wind tunnel device 60 (see, e.g., control system/operating console in FIG. 7).

Recirculating wind tunnels typically include corner turning vanes for redirecting airflow around the corners of the wind tunnel. For example, as shown in FIG. 5, each of the corners 26, 28, 30, 32 of the wind tunnel device 10 may include turning vanes 29. The turning vanes 29 may be spaced intermittently along a diagonal line from the interior of each respective corner to the exterior of each respective corner. The turning vanes 29 may be configured to provide minimum loss and disturbance of airflow as the airflows around the corner. The turning vanes 29 may be placed within the corners to reduce wind resistance and direct airflow away from the right angled surfaces of the corners to direct the airflow around the corners.

Referring to FIG. 10, the wind tunnel device 60 includes rotatable turning vanes 64 in an upper left-hand corner of the wind tunnel 19. The turning vanes 64 may be configured substantially the same as the turning vanes 29, except the turning vanes 64 are rotatable between an open position (see FIGS. 10 and 11) and a closed position (see FIGS. 8 and 9). In the open position depicted in FIGS. 10 and 11, the turning vanes 64 function the same as the turning vanes 29 to facilitate airflow around the corners of the wind tunnel 19 during re-circulation of air through the tunnel 19. In the closed position depicted in FIGS. 8 and 9, the turning vanes 64 create a blockage (e.g., a sealed wall) in the tunnel 19 that inhibits re-circulation of air through the tunnel 19. In the closed position, the turning vanes 64 may overlap one another to inhibit airflow from re-circulating through the tunnel 19. In some implementations, the turning vanes 64 may rotate about 90 degrees to transition between the open and closed positions. The rotational range of the turning vanes 64 may vary depending on the design of the turning vanes 64.

Figure 9:
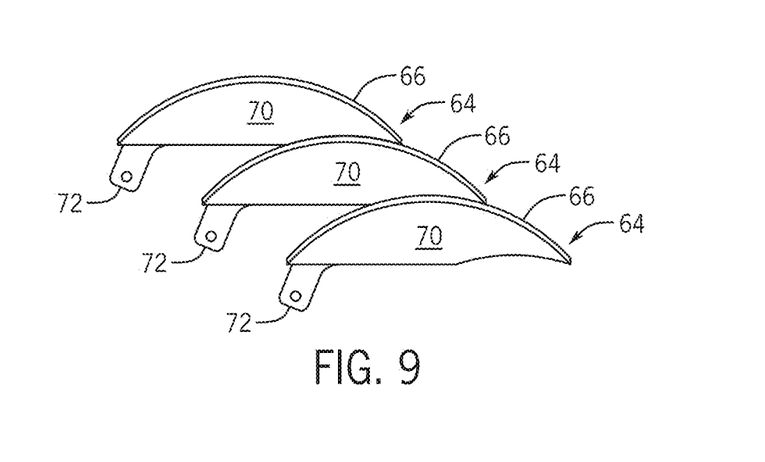
FIG. 9 is a detail of multiple turning vanes of the wind tunnel device of FIG. 8 in an open position of the wind tunnel device in which the turning vanes are in a closed position to prevent airflow from recirculating.
Figure 11:
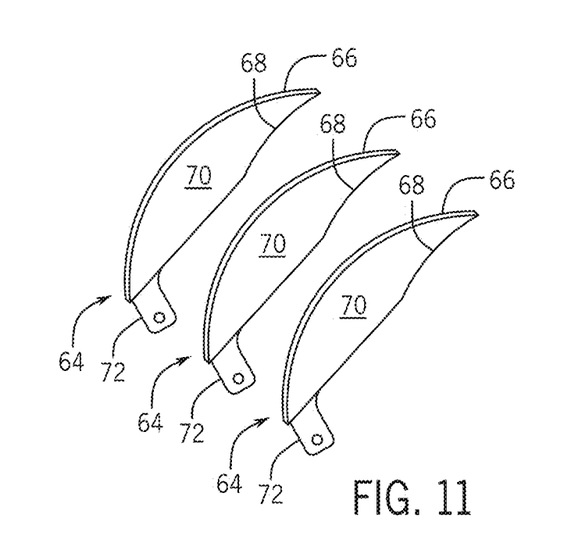
FIG. 11 is a detail of multiple turning vanes of the wind tunnel device of FIG. 10 in a closed position of the wind tunnel device in which the turning vanes are in an open position and permit recirculation of airflow.

In some implementations, the turning vanes 64 may be configured as louvers or aerodynamic arcuately-shaped vanes. In more specific implementations, the turning vanes 64 may be constant-arc vanes. Referring to FIGS. 9 and 11, a subset of the turning vanes 64 depicted in FIGS. 8 and 10 are illustrated for reference. The turning vanes 64 each may include an arcuate or curved wall 66 that extends across the tunnel 19. In a closed position (see FIG. 9), the turning vanes 64 may overlap and contact one another to form a sealed interface that inhibits re-circulating airflow through the tunnel 19. For example, as illustrated in FIG. 9, the curved walls 66 may overlap and contact one another to form the sealed interface. The turning vanes 64 may include a recess 68 formed in an end plate 70 of the vanes 64 (see FIG. 11) to prevent interference between the end plates 70 of adjacent closed vanes 64 (see FIG. 9). In an open position (see FIG. 11), the turning vanes 64 may be spaced apart from one another to permit airflow between the vanes 64, and may be oriented within the corner of the tunnel 19 to facilitate airflow around the corner. For example, as illustrated in FIG. 11, the curved walls 66 may be spaced apart from one another to permit airflow between the walls 66, and the curvature of the walls 66 may facilitate airflow around the corner. The geometry, spacing, and number of turning vanes 64 may vary depending on the design of the tunnel 19. In one embodiment, a spacing to chord ratio (s/c) of the vanes 64 is about 40 percent.

The turning vanes 64 may be joined together to facilitate simultaneous rotation of the vanes 64. As illustrated in FIGS. 9 and 11, the turning vanes 64 may include tabs 72. The tabs 72 may be connected together via a rod or other elongate member capable of rotating the vanes 64 in unison. In some implementations, the tabs 72 may define apertures therein to facilitate interconnection of the vanes 64. Rotation of the turning vanes 64 may be controlled by a computer 52 (see FIG. 7), which may control an actuator coupled to the turning vanes 64.

Referring to FIGS. 8 and 10, the wind tunnel device 60 may be configured to have an open-loop tunnel or a closed-loop tunnel depending on the position of the turning vanes 64. The turning vanes 64 may be rotatable to either partition-off or redirect the flow of the tunnel 19, thereby transforming the flow path from a closed-return circuit (FIG. 10) to an open-return circuit (FIG. 8), and vice versa. As illustrated in FIG. 10, when the turning vanes 64 are open, the tunnel 19 forms a closed loop in which airflow 62 re-circulates through the tunnel 19. As illustrated in FIG. 8, when the turning vanes 64 are closed, the tunnel 19 forms an open loop in which airflow 62 only passes once through the test section 38 of the tunnel 19.

In addition to actuating interior turning vanes 64, baffles or dampers (referenced herein as "dampers" for the sake of simplicity and without intent to limit) associated with external ductwork may be actuated to redirect the flow from a closed-loop or recirculating design (see FIG. 10) into an open-loop condition (see FIG. 8), and vice versa. The dampers may be positioned on both sides of the turning vanes 64. For example, a first set of dampers 74 may be positioned on a downstream side of the turning vanes 64 and a second set of dampers 76 may be positioned on the upstream side of the turning vanes 64. The dampers 74, 76 may be associated with external ductwork in fluid communication with outside air. For example, the dampers 74 may be associated with a supply duct 78 configured to supply air (represented by arrows 80 in FIG. 8) to the tunnel 19. The dampers 76 may be associated with an exhaust duct 82 configured to permit airflow (represented by arrows 84 in FIG. 8) out of the tunnel 19.

The dampers 74, 76 may be biased toward a closed position (see FIG. 10) in which the dampers 74, 76 inhibit airflow between the tunnel 19 and the ducts 78, 82. For example, a biasing element (such as a spring) may bias the dampers 74, 76 into the closed position to seal the ducts 78, 82. The airflow generated by the fan 12 may be sufficient to move the dampers 74, 76 into an open position (see FIG. 8) when the turning vanes 64 are closed. As such, during operation of the wind tunnel device 60, the fan 12 may continuously run. To switch the operating mode of the wind tunnel device 60, the turning vanes 64 can be rotated and then the dampers 74, 76 are closed (e.g., via a biasing element) or opened (e.g., via the fan 12). For example, when the operating mode of the wind tunnel device 60 is switched from a closed-loop configuration to an open-loop configuration, the turning vanes 64 are rotated into a closed position and inhibit re-circulation of airflow through the tunnel 19, and thus the airflow of the fan 12 opens the dampers 74 in the supply duct 78 and the dampers 76 in the exhaust duct 82. When the operating mode of the wind tunnel device 60 is switched from an open-loop configuration to a closed-loop configuration, the airflow of the fan 12 is allowed to re-circulate through the tunnel 19, and thus the bias of the dampers 74, 76 causes the dampers 74, 76 to close.

When the wind tunnel device 60 is being operated in a closed operating mode (see FIG. 10), the turning vanes 64 are opened and the dampers 74, 76 are closed to form a fully-closed loop tunnel 19. In this configuration, the wind tunnel device 60 functions as a re-circulating wind tunnel. Airflow 62 generated by fan 12 may pass through a temperature control unit 86, which may be coupled to a chilled water supply 88. After the temperature control unit 86, the airflow 62 may pass through the test section 38, into the scrubber 51 (such as a mist extractor), and back to the fan 12. Droplets collected by the scrubber 51 may enter a waste disposal unit, which may include drains line 90, a fresh water line 92, a liquid trap 94, a hazardous waste tank 96, and a lab waste line 98.

When the wind tunnel device 60 is being operated in a closed-loop configuration (FIG. 10), the re-circulated air may need to be refreshed/reconditioned (referenced herein as "reconditioned" for the sake of simplicity and without intent to limit) after a period of operation. To recondition the air in the tunnel 19, the wind tunnel device 60 may be reconfigured into the open-loop configuration (FIG. 8) for a short period of time, and then the wind tunnel device 60 may be reconfigured back into the closed-loop configuration (FIG. 10) while continuously operating the wind tunnel device 60. In this manner, the configuration illustrated in FIG. 8 may be referred to as a purge mode in which the air inside the test section 38 of the tunnel device 60 may be reconditioned rapidly. Reasons to recondition the air in the tunnel 19 may include reducing humidity levels in the tunnel 19 (especially for spray wind tunnels), reducing temperature in the tunnel 19, and reducing vapor content (e.g., pesticides) in the tunnel 19. By intermittently operating the wind tunnel device 60 in an open-loop configuration (FIG. 8), the air inside the tunnel 19 may be reconditioned rapidly by sucking in new air and forcing out old air. Alternatively, the wind tunnel device 60 may be maintained in the open-loop configuration (FIG. 8) for open-loop tunnel testing.

When the wind tunnel device 60 is being operated in an open-loop operating mode (see FIG. 8), the turning vanes 64 are closed and the dampers 74, 76 are opened to form an open-loop tunnel 19. In this configuration, the fan 12 draws air from outside the tunnel 19, passes the air through the test section 38, and exhausts the air back outside the tunnel 19. More specifically, the fan 12 draws outside air into the tunnel 19 through the supply duct 78 and forces air out of the tunnel 19 through the exhaust duct 82. Airflow 62 generated by fan 62 may enter the tunnel 19 from the supply duct 78, pass through the temperature control unit 86. After the temperature control unit 86, the airflow passes through the test section 38 into the scrubber 51 (such as a mist extractor), and back to the fan 12. Droplets collected by the scrubber 51 may enter the waste disposal unit, which may include drain lines 90, the fresh water line 92, the liquid trap 94, the hazardous waste tank 96, and the lab waste line 98.

By manipulating the turning vanes 64 and the dampers 74, 76, the wind tunnel device 60 may function as a multi-use, multi-mode wind tunnel device. In other words, the wind tunnel device 60 may transform between two modes of operation, and the air within the tunnel 19 may be reconditioned during operation of the wind tunnel device 60.

The wind tunnel device 60 may enable a closed-return wind tunnel to mimic an open-return wind tunnel, while still keeping the benefits of a closed system, and vice versa. In other words, the wind tunnel device 60 may provide two-tunnels in one: an open return wind tunnel and a closed return wind tunnel. Additionally, or alternatively, the wind tunnel device 60 may enable reconditioning of the air inside the tunnel 19 quickly without long downtimes. The wind tunnel device 60 may be applicable for users in atmospheric/sprays wind tunnel research, as well as generally for users in agriculture, aerospace, and aerodynamics, among others.

Existing infrastructure of closed-return wind tunnels may be used to form the reconfigurable wind tunnel device 60. For example, a wind tunnel device (such as wind tunnel device 10) may be configured as a multi-use, multi-mode wind tunnel device 60 by converting one or more sets of corner turning vanes 29 into rotating turning vanes 64 and by including supply and exhaust ducts 78, 82 with dampers 74, 76, respectively, that are operable via a tunnel fan (such as fan 12).

Although the present disclosure provides references to preferred embodiments, persons skilled in the art will recognize that changes may be made in form and detail without departing from the spirit and scope of the invention. For example, although the reconfigurable wind tunnel device is described with rotating turning vanes, the reconfigurable wind tunnel device may include other rotatable members (such as baffles, dampers, and other members capable of rotating between an open position in which the members permit re-circulation of air through the tunnel and a closed position in which the members inhibit re-circulation of air through the tunnel. Similarly, the reconfigurable wind tunnel device may include members that slide or otherwise move between an open position in which the members permit re-circulation of air through the tunnel and a closed position in which the members inhibit re-circulation of air through the tunnel.

What is claimed is:

1. A wind tunnel device comprising:
a tunnel configured to receive forced air and having a supply inlet an exhaust outlet and a generally rectangular path;
a plurality of rotatable turning vanes positioned in a corner of the generally rectangular path of the tunnel between the supply inlet and the exhaust outlet, wherein at least one rotatable turning vane comprises a recess configured to accommodate an adjacent closed rotatable turning vane of the plurality of rotatable turning vanes,
wherein:
in a first configuration, the plurality of rotatable turning vanes are configured to permit re-circulation of air through the tunnel, and
in a second configuration, the plurality of rotatable turning vanes are configured to inhibit re-circulation of air through the tunnel.

2. The device of claim 1, wherein the at least one rotatable turning vane is configured to overlap a portion of the adjacent closed rotatable turning vane along the recess.

3. The device of claim 1, wherein the at least one rotatable turning vane is configured to form a substantially air-tight seal with the adjacent closed rotatable turning vane.

4. The device of claim 1, wherein the at least one rotatable turning vane defines a curved contour on a first side, the curved contour configured to direct air around the corner of the tunnel.

5. The device of claim 4, wherein the recess of the rotatable turning vane is on a second side of the rotatable turning vane opposite the first side.

6. The device of claim 1, wherein the plurality of rotatable turning vanes are spaced intermittently along a diagonal line from a first end of the corner to a second end of the corner.

7. The device of claim 6, wherein the plurality of rotatable turning vanes are configured to simultaneously rotate.

8. The device of claim 1, wherein the recess is configured to prevent interference between the at least one rotatable turning vane and an end plate of the adjacent closed rotatable turning vane.

9. The device of claim 1, wherein the at least one rotatable turning vane comprises an end plate and the recess is formed in the end plate.

10. The device of claim 1, wherein:
the supply inlet is coupleable with a supply duct having a first damper, and
the exhaust outlet is coupleable with an exhaust duct having a second damper.

11. The device of claim 10, wherein the plurality of rotatable turning vanes are movable into:
the first configuration when the first and second dampers are biased toward a closed position, and
the second configuration when the first and second dampers are biased toward an open position.

12. A method of operating a wind tunnel comprising:
configuring the wind tunnel as an open-return wind tunnel in which the wind tunnel defines a generally rectangular path and is configured to permit air to enter the wind tunnel via a supply inlet and exit the wind tunnel via an exhaust outlet, wherein the wind tunnel comprises a plurality of rotatable turning vanes positioned in a corner of the generally rectangular path of the tunnel between the supply inlet and the exhaust outlet, and wherein at least one rotatable turning vane comprises a recess configured to accommodate an adjacent closed rotatable turning vane of the plurality of rotatable turning vanes; and
rotating the plurality of rotatable turning vanes between:
a first configuration, in which the plurality of rotatable turning vanes are configured to permit re-circulation of air through the tunnel; and
a second configuration, in which the plurality of rotatable turning vanes are configured to inhibit re-circulation of air through the tunnel.

13. The method of claim 12, wherein in the second configuration, the at least one rotatable turning vane overlaps a portion of the adjacent closed rotatable turning vane along the recess.

14. The method of claim 12, further comprising establishing a substantially air-tight seal between the at least one rotatable turning vane and the adjacent closed rotatable turning vane.

15. The method of claim 12, wherein the rotation of the plurality of rotatable turning vanes comprises simultaneously rotating the plurality of rotatable turning vanes between the first and second configurations.

16. The method of claim 12, further comprising operating the wind tunnel, with the plurality of rotatable turning vanes in the first configuration, as a closed-loop wind tunnel in which air is recirculated through the wind tunnel via a fan positioned in the wind tunnel.

17. The method of claim 12, further comprising using an electric actuator to transition the plurality of rotatable turning vanes between the first configuration and the second configuration in response to a signal from a computer controller.

18. The method of claim 12, further comprising directing airflow away from right angle surfaces of the wind tunnel using a curved contour of the at least one rotatable turning vane.

* * * * *